United States Patent
Bedo

(10) Patent No.: US 12,471,196 B2
(45) Date of Patent: Nov. 11, 2025

(54) LUMINAIRE SYSTEM WITH SPD

(71) Applicant: Schreder S.A., Brussels (BE)

(72) Inventor: Peter Balázs Bedo, Budapest (BE)

(73) Assignee: Schreder S.A., Brussels (BE)

( * ) Notice: Subject to any disclaimer, the term of this patent is extended or adjusted under 35 U.S.C. 154(b) by 463 days.

(21) Appl. No.: 17/421,282

(22) PCT Filed: Jan. 9, 2020

(86) PCT No.: PCT/EP2020/050419
§ 371 (c)(1),
(2) Date: Jul. 7, 2021

(87) PCT Pub. No.: WO2020/144272
PCT Pub. Date: Jul. 16, 2020

(65) Prior Publication Data
US 2022/0159808 A1    May 19, 2022

(30) Foreign Application Priority Data
Jan. 9, 2019  (NL) ..................... 2022357

(51) Int. Cl.
*H02H 9/00* (2006.01)
*H02H 9/04* (2006.01)
(Continued)

(52) U.S. Cl.
CPC ............ *H05B 45/50* (2020.01); *H02H 9/042* (2013.01); *H05B 47/19* (2020.01)

(58) Field of Classification Search
None
See application file for complete search history.

(56) References Cited

U.S. PATENT DOCUMENTS 4,901,183 A * 2/1990 Lee ............... H02H 9/042 361/111
8,284,536 B2 * 10/2012 Minarczyk ........ H05B 41/292 361/115
(Continued)

FOREIGN PATENT DOCUMENTS

WO    9960826 A1    11/1999

OTHER PUBLICATIONS

Finis, Gernot, Martin Wetter, Holger Heckler, and Steffen Pförtner. "Advanced Monitoring, Diagnostics, Remote Indication and Testing of SPDs Connected to Telecommunications and Signalling Networks." In 2018 34th International Conference on Lightning Protection (ICLP), pp. 1-8. IEEE, 2018.
(Continued)

*Primary Examiner* — Stephen W Jackson
(74) *Attorney, Agent, or Firm* — McDonnell Boehnen Hulbert & Berghoff LLP

(57) ABSTRACT

Example embodiments relate to luminaire systems with SPD. One example luminaire system includes a luminaire housing, a support with at least one light source arranged thereon, a drive means configured for driving the at least one light source, a surge protection device between a power supply and the drive means, and an indicator device. The surge protection device includes surge protection circuitry and monitoring circuitry configured to monitor a malfunctioning of the surge protection circuitry and provide an output signal based on the monitoring. The monitoring circuitry is connected such that a state of the indicator device is changed when the output signal indicates a malfunctioning. The indicator device is arranged at a location which is such that the state of the indicator device is visible from outside of the luminaire housing.

20 Claims, 9 Drawing Sheets

(51) Int. Cl.
    *H05B 45/50*     (2022.01)
    *H05B 47/19*     (2020.01)

(56) References Cited

U.S. PATENT DOCUMENTS

| | | | |
|---|---|---|---|
| 10,004,123 B1 | 6/2018 | Yang et al. | |
| 2002/0054465 A1* | 5/2002 | Gerlach | H01T 4/06 |
| | | | 361/111 |
| 2005/0231872 A1 | 10/2005 | Schimanski et al. | |
| 2011/0057567 A1* | 3/2011 | Ruan | H05B 47/105 |
| | | | 315/119 |
| 2013/0181609 A1 | 7/2013 | Agrawal | |
| 2014/0042908 A1* | 2/2014 | Mercier | H05B 45/50 |
| | | | 315/125 |
| 2014/0253164 A1 | 9/2014 | Pfortner et al. | |
| 2015/0091471 A1* | 4/2015 | Shan | H05B 47/17 |
| | | | 315/294 |
| 2015/0163868 A1* | 6/2015 | Houot | H05B 45/00 |
| | | | 315/113 |
| 2015/0222112 A1* | 8/2015 | Wallace | H02H 1/0061 |
| | | | 361/90 |
| 2015/0257229 A1 | 9/2015 | Wassel et al. | |
| 2016/0330825 A1 | 11/2016 | Recker et al. | |
| 2016/0372919 A1 | 12/2016 | Kim et al. | |
| 2022/0070986 A1* | 3/2022 | Johnston | H05B 47/115 |
| 2022/0113014 A1* | 4/2022 | Secretin | H02H 9/06 |

OTHER PUBLICATIONS

PCT International Search Report and Written Opinion, Application No. PCT/EP2020/050419, dated Feb. 25, 2020, 21 pages.

Dehn International, "Surge protection concept for LED street lights", Translated reprint from netzpraxis, issue Nov. 14, 2015, 8 pages.

* cited by examiner

LUMINAIRE SYSTEM WITH SPD

CROSS-REFERENCE TO RELATED APPLICATIONS

The present application is a national stage entry of PCT/EP2020/050419 filed Jan. 9, 2020, which claims priority to NL 2022357 filed Jan. 9, 2019, the contents of each of which are hereby incorporated by reference.

FIELD OF INVENTION

The invention relates to a luminaire system, in particular a luminaire system with at least one light source, a drive means for driving the at least one light source, and a surge protection device, and to a luminaire comprising such a luminaire system.

BACKGROUND

Luminaire systems, in particular outdoor luminaire systems, comprise a luminaire housing in which a support with at least one light source is arranged. Typically, the at least one light source comprises a plurality of light-emitting diodes (LEDs). For example, a luminaire system may comprise a luminaire pole and a luminaire head formed by the luminaire housing. In other luminaire systems, the luminaire head may be connected to a wall. A drive means for the at least one light source, typically in the form of a LED driver, may be arranged in or on the luminaire head, in or on the luminaire pole, or in any other suitable location of the luminaire system.

In order to leverage the benefit of long life of the at least one light source, typically a plurality of LEDs, the luminaire system is typically designed to be robust under lighting surge events. Surge protection devices (SPDs) are provided to absorb energy and protect the drive means, typically including a LED driver circuit. However, an SPD can fail under certain conditions (e.g., a surge event with excessive voltage). One desired feature is for the luminaire system to be able to provide a failure indication mechanism in case a surge protection device (SPD) fails. Such indication mechanism upon SPD failure alerts customers or operators so that a failed SPD can be replaced in a timely manner. This saves time and costs for customers and operators who would otherwise spend lengthy time troubleshooting SPD failures, which, if unresolved, could require replacement of the entire drive means and/or other components of the luminaire system.

Prior art solution use SPDs with surge protection circuitry and monitoring circuitry configured to monitor a malfunctioning of the surge protection circuitry. The SPD is provided with two output pins for connection to a warning LED to provide an indication of the malfunctioning of the surge protection circuitry.

SUMMARY

The object of embodiments of the present invention is to provide a luminaire system with an improved failure indication mechanism for indicating when a surge protection device has failed.

According to an aspect of the invention there is provided a luminaire system comprising a luminaire housing, a support with at least one light source arranged thereon, a drive means configured for driving the at least one light source, a surge protection device between a power supply and the drive means, and an indicator device. The surge protection device comprises surge protection circuitry and monitoring circuitry configured to monitor a malfunctioning of the surge protection circuitry and to provide an output signal based on said monitoring. The monitoring circuitry is connected such that a state of the indicator device is changed when the output signal indicates a malfunctioning. The indicator device is arranged at a location which is such that the state of the indicator device is visible from outside of the luminaire housing.

By adding an indicator device such as a LED such that the state of the indicator device is visible from outside of the luminaire housing, an operator can easily detect a malfunctioning without having to open the luminaire housing. For example, in case of a typical outdoor luminaire, the malfunctioning may be visible for an operator from a location at ground level.

Adding an indicator device, preferably an optical indicator device, such as a LED can be done in various ways. Preferably, the indicator device is arranged on or in the luminaire housing. For example, the indicator device may be arranged on the support of the at least one light source.

In a preferred embodiment, the luminaire housing comprises a transparent or translucent cover, and the support with the at least one light source is arranged in the luminaire housing, opposite the cover. The indicator device may then be arranged in the luminaire housing, near the cover, e.g. on the support, such that the state thereof is visible through the cover. Alternatively, the luminaire housing may comprise a specific transparent or translucent indicator cover, and the indicator device may then be arranged in the luminaire housing, near the indicator cover. In yet other embodiment, a state of the indicator device may be visible through another portion of the luminaire system. For example, the luminaire system may comprise a light module including the support, and a further module, e.g. a light ring module or another functional module, including the indicator device. In such an embodiment, the modules may be arranged one above the other. Alternatively, the modules may be arranged next to each other. For example, the luminaire system may comprise a pole and a light module shaped as a luminaire head including the support, wherein an additional ring including the indicator device is included between the luminaire head and the pole.

In an exemplary embodiment, the indicator device comprises an indicator light element and a light guide arranged for guiding light of the indicator light element to a location which is such that the state of the indicator device is visible from outside of the luminaire housing. The indicator light element may be a LED which is part of a surge protection module containing the surge protection circuitry. The light guide can guide the light to a suitable location which can be easily checked by an operator at ground level. For example, the light guide may extend from the indicator light element to a location on or near the support, such that light passing through the light guide is emitted out of the luminaire housing through the transparent or translucent cover. According to another example, the light guide extends from the indicator light element to a location in or near the pole which is accessible by an operator at ground level. According to another example, the light guide extends to a separate transparent or translucent cover or plug arranged in the luminaire housing.

In an exemplary embodiment, the luminaire housing is provided with a socket, wherein the indicator device is arranged in the socket, and the monitoring circuitry is connected in such a way to the socket that a state of said indicator device is changed when the output signal indicates a malfunctioning. For example, the indicator device may be included in a watertight external module in which an indicator LED is mounted, and which is adapted to be inserted in the socket. This external module may contain also other functionalities. For example, the external module may be adapted to signal other messages in addition to the malfunctioning of the surge protection circuitry and/or to sense data such as environmental data (for example, the external module may comprise a movement sensor, a light sensor, an image sensor, a radar sensor, etc.) and/or to communicate with other devices. Such external module may be for example a NEMA or Zhaga module as described in more detail below.

The surge protection circuitry and monitoring circuitry may be configured to provide the output signal automatically or on request, e.g. on request of maintenance personnel. In other words, a push mechanism and/or a pull mechanism may be used to signal the malfunctioning. For example, upon request, the indicator device may emit a green light if the surge protection circuitry is OK or a red light if the surge protection circuitry is broken.

According to an exemplary embodiment the monitoring circuitry is configured to monitor a malfunctioning of the surge protection circuitry and to provide an output signal based on said monitoring, when the at least one light source is off. In that manner, it is possible to check the functioning of the surge protection circuitry of a luminaire during daytime e.g. during working hours, when the at least one light source is off. For certain embodiments, where the indicator device is included in or near the luminaire head, this further has the advantage that it is easier to look at the luminaire head from the ground when the light is off.

According to an aspect of the invention there is provided a luminaire system comprising a support with at least one light source arranged thereon, a drive means configured for driving the at least one light source, a surge protection device between a power supply and the drive means, and an indicator device arranged on the support of the at least one light source. The surge protection device comprises surge protection circuitry and monitoring circuitry configured to monitor a malfunctioning of the surge protection circuitry and to provide an output signal based on said monitoring. The monitoring circuitry is connected such that a state of said indicator device is changed when the output signal indicates a malfunctioning.

By including the indicator device on the same support as the support for the at least one light source of the luminaire system, a simple and robust solution is provided with a limited cost. More in particular, adding an indicator device such as a LED to the support containing the at least one light source can be easily achieved and does not entail other modifications to the luminaire system. For example, it is not required to provide an additional opening or transparent cover in the housing to make the indicator device visible. Also, by adding an indicator device such as a LED to the support, when the support is included for example in a typical outdoor luminaire, it will be easily visible from the ground, and the housing with a transparent or translucent cover provided for the support with the at least one light source will also serve as a protection for the indicator device.

Preferably, the monitoring circuitry is connected such that the output signal is provided to at least one of:
the indicator device such that a state of said indicator device is changed when the output signal indicates a malfunctioning,
drive and/or control circuitry of the drive means configured for driving the indicator device based on the output signal, such that a state of said indicator device is changed when the output signal indicates a malfunctioning,
a control means configured for controlling the drive means based on said output signal, wherein the drive means is configured to drive the indicator device such that a state of said indicator device is changed when the output signal indicates a malfunctioning.

In other words the output signal may be provided directly to the indicator device or via drive or control means. When the output signal is provided directly to the indicator device, the monitoring circuit may be configured to provide, as an output signal, a current or voltage having a level which is suitable to power the indicator device when a malfunction is detected, whilst the level is not adapted to power the indicator device when the SPD operates normally, or vice versa. In another embodiment, the drive means comprise drive and/or control circuitry configured to drive the indicator device, and the output signal is provided to the drive means, so that the drive means can drive the indicator device based on the received output signal. As the drive means also have to drive the at least one light source, such a solution may be advantageous in terms of required connections. In yet another embodiment, the luminaire system comprises a control means configured for controlling the drive means, and the output signal is provided to the control means. Such control means may then also control the drive means in order to control the powering of the indicator device such that the indicator device indicates a malfunctioning when the output signal indicates a malfunctioning.

According to an exemplary embodiment, the indicator device comprises at least one LED. The at least one LED may comprise at least one LED configured to emit an indicator light different from the light emitted by the at least one light source. For example the indicator may be a dedicated, specific light, e.g. a light with a particular color, such as a red color, a light with a determined wavelength, a light with a flashing pattern, etc. A red light is advantageous in the sense that red is a generally accepted color to indicate a malfunctioning, and in that it can be easily distinguished from the color of the at least one light source which is usually a warm or cold white. However, the at least one indicator LED may also be configured to emit another color, e.g. green or blue. Alternatively or additionally, the indicator device could be configured to emit light with a flashing pattern. Also, the indicator device could be another visible light source (e.g. laser, UV, IR, a flash light, etc.). In yet another embodiment, a transparent or translucent cover is arranged over the at least one light source and the at least one indicator light, and a small portion of the transparent or translucent cover is provided in a color, such that this colored portion lights up when the at least one indicator light is activated.

In a possible embodiment, the luminaire system further comprises an optical plate arranged opposite the at least one light source on the support. Preferably, the optical plate is a lens plate comprising at least one lens elements associated with the at least one light source. In a possible embodiment, the indicator device comprises at least one indicator light element arranged to emit light through a peripheral edge of the optical plate. Optionally, the optical plate may be provided with light guiding elements (e.g. in the form of recesses or protrusions in the optical plate) guiding the light from the at least one indicator light element out of the luminaire system. In another possible embodiment, the indicator device comprises at least one indicator light element, and the optical plate may comprise at least one optical element, e.g. at least one lens element, associated with the at least one indicator light element. In an exemplary embodiment, the optical plate may have a colored portion (e.g. an optical element), such that this colored portion lights up when the at least one indicator light is activated.

In the context of the invention, a lens element may include any transmissive optical element that focuses or disperses light by means of refraction. It may also include any one of the following: a reflective portion, a backlight portion, a prismatic portion, a collimator portion, a diffusor portion. For example, a lens element may have a lens portion with a concave or convex surface facing a light source, or more generally a lens portion with a flat or curved surface facing the light source, and optionally a collimator portion integrally formed with said lens portion, said collimator portion being configured for collimating light transmitted through said lens portion. Also, a lens element may be provided with a reflective portion or surface or with a diffusive portion.

According to a second aspect there is provided a luminaire system comprising a support with at least one light source arranged thereon, a drive means configured for driving the at least one light source, a surge protection device between a power supply and the drive means, and a transmission means. The surge protection device comprises surge protection circuitry and monitoring circuitry configured to monitor a malfunctioning of the surge protection circuitry and to provide an output signal based on said monitoring. The monitoring circuitry is connected such that the output signal can be provided to the transmission means and the transmission means is configured for transmitting a malfunction message to a remote device based on the output signal.

By providing the possibility to send malfunction messages to a remote device, an appropriate action can be taken to replace the SPD.

The remote device may be any device remote from the luminaire system, e.g. a remote server, a mobile device (such as a smartphone, tablet or laptop), another luminaire system, etc. The transmission may be done using a long-distance communication protocol or using a short-distance communication protocol. For example, the transmission may be done through a cellular network or may be done through a mesh network. In a possible embodiment, the transmission is done using a short-distance communication protocol and the malfunction message is sent to a nearby other luminaire system. This nearby other luminaire system may then be configured with a transmission means configured to communicate the message using a long-distance communication protocol to another remote device, e.g. a remote server and/or a mobile device. In another possible embodiment, the transmission by the transmissions means is done directly to a remote device, such as a mobile device or a remote server, using a long-distance communication protocol. The transmission to a nearby mobile device may also be done using a short-distance communication protocol.

The short-distance or short-range protocol may be an IEEE 802.15.4-based protocol, such as a Zigbee. It may also be any one of the following: 6LoWPAN, Bluetooth, Z-wave, BLE, WiFi, NFC (Near Field Communication), Sigfox, etc. The long-distance or long-range protocol may be any cellular network standard, and more in particular any 1G, 2G, 3G, 4G or 5G cellular network standard, e.g. GSM, GPRS, LTE, etc. However, also other long-distance protocols may be used such as Ethernet or LoraWan.

According to an exemplary embodiment, the transmission means and the drive means are included in a driver having a single driver housing. However, in other embodiments, the transmission means may be included in a separate controller, e.g. a controller connected to a luminaire housing through a socket such as a NEMA or Zhaga socket.

According to an exemplary embodiment, the malfunction message may be automatically sent, e.g. when the output signal indicates a malfunctioning. Alternatively or in addition, the transmission means may be configured to receive a request for information about the functioning of the surge protection circuitry from a remote device, and to send in response a malfunction message comprising an indication whether or not there is a malfunctioning of the surge protection circuitry based on the output signal to the remote device. In other words, a push mechanism and/or a pull mechanism may be used to transmit the malfunction message to a remote device.

According to a third aspect there is provided a luminaire system comprising a support with at least one light source arranged thereon, a drive means configured for driving the at least one light source, a surge protection device between a power supply and the drive means, and a display. The surge protection device comprises surge protection circuitry and monitoring circuitry configured to monitor a malfunctioning of the surge protection circuitry and to provide an output signal based on said monitoring. The monitoring circuitry is connected such that a message is indicated on the display when the output signal indicates a malfunctioning. Preferably, the display comprises a display screen configured to display text and/or images to an operator. For example, a message could be automatically displayed at specific moments in time (e.g. when the luminaire is switched on) with an indication on whether the surge protection circuitry is still working or not.

Such an embodiment will in particular be advantageous when a display is present in the luminaire system for other purposes. For example, a display could be present to provide passersby with information, such as environmental information, advertisements, information about the area, etc. Such a display may be provided to any component of the luminaire system. For example, the display may be integrated in, positioned in, or provided to a luminaire pole of the luminaire system, a component such as a cabinet, attached to the luminaire pole or located adjacent the luminaire pole, a luminaire head, a luminaire module, etc.

The message may be e.g. a symbol, a color, a text message, etc.

According to an exemplary embodiment, the monitoring circuitry is connected such that the output signal is provided to at least one of:
   the display such that said display can indicate a malfunctioning when the output signal indicates a malfunctioning,
   a control means configured for controlling the display based on said output signal,
   drive and/or control circuitry of the drive means configured for driving and controlling the display based on the output signal.

In other words the output signal may be provided directly to the display or via drive or control means. In a possible embodiment, the luminaire system comprises a control means configured for controlling the display, and the output signal is provided to the control means. Such control means may then also control the image data to be displayed such that the display indicates a malfunctioning when the output signal indicates a malfunctioning. In another embodiment, the drive means of the at least one light source also comprises drive and/or control circuitry configured to drive the display, and the output signal is provided to the drive means, so that the drive means can drive and control the display based on the received output signal.

It is noted that the various aspects described above may be combined. For example, a luminaire system according to the first and/or third aspect may further comprise a transmission means configured for transmitting a malfunction message to a remote device based on the output signal.

According to an exemplary embodiment, the support is a PCB. In that way the at least one light source and optionally the indicator device can be easily connected with the drive means, and optionally with the SPD.

The preferred features described below may be present in luminaire systems according to any one of the aspects described above.

According to a preferred embodiment, the at least one light source comprises at least one LED, 35 preferably a plurality of LEDs.

According to an exemplary embodiment, the drive means is configured to convert an AC voltage in a DC drive current for the at least one light source. Such converter circuitry is preferred when the at least one light source comprises light emitting diodes. In that manner, a plurality of light emitting diodes connected in series can be easily provided with a drive current. However, in alternative embodiments, a voltage-to-voltage converter may be used. More generally, depending on the type of light source, the drive means may be any suitable drive means to drive the light source. The drive means may be included in a separate driver housing, but may also be provided as a part of an integrated PCB board. Also, the drive means may comprise a plurality of drivers included in separate housings for driving the at least one light source and various other components such as the indicator device.

According to an exemplary embodiment, the surge protection circuitry and monitoring circuitry is arranged in a housing, and the housing is provided with at least two power terminals for connecting the surge protection circuitry to a power supply, and with at least one output terminal for outputting the output signal. Optionally, also a ground or equipotential terminal may be provided. In a first possible embodiment, the surge protection device may be configured for being connected in parallel, with a first and a second power terminal connected to a first and a second power supply line between the power supply and the drive means. In a second possible embodiment, the surge protection device may be configured for being connected in series, with a first and a second power terminal connected to a first and a second power supply line leading to the power supply with a third and fourth power terminal connected to a third and a fourth power supply line leading to the drive means. In some embodiments, there may be provided only one output terminal, but in other embodiments there may be provided two or more output terminals. For example, the output signal may be a voltage signal present between two output terminals.

According to an exemplary embodiment, the surge protection circuitry comprises at least one metal oxide varistor (MOV) and/or at least one thermal protection device such as a thermal fuse and/or a gas discharge tube (GDT).

In a preferred embodiment a thermal fuse and a MOV are connected in series between two power terminals of the SPD. The MOV clamps the voltage between the terminals L, N to a predetermined maximum voltage that is selected to be within the limits required by the drive means. The thermal fuse will open when the temperature caused by an excess current exceeds a predetermined threshold. In that way the MOV is protected from high currents. The threshold may be selected to open the thermal fuse before the heat generated is so high as to cause failure of the MOV that could damage other components of the drive means.

In a possible embodiment the GDT is connected between a ground or equipotential terminal and at least one of the at least two power terminals. The GDT creates an effective short circuit when triggered, so that if any electrical energy is present on the at least one terminal, the GDT will form a short-circuit. Once triggered, the GDT will continue conducting until all electric current sufficiently diminishes, and the gas discharge quenches.

According to an exemplary embodiment, the monitoring circuitry comprises a first monitoring line on one side of the MOV and a second monitoring line on the other side of the MOV. For example, the first monitoring line is connected directly or indirectly to a first terminal of the MOV and a second monitoring line is connected directly or indirectly to a second terminal of the MOV.

The monitoring circuitry may consist only of one or more monitoring lines without any active electrical components. The presence of monitoring circuitry in the surge protection device implies that there is at least one output terminal connected to the at least one monitoring line.

According to an exemplary embodiment, the monitoring circuitry comprises a galvanic isolation configured to isolate a connection to the surge protection circuitry from the at least one output terminal.

In an exemplary embodiment, the drive means comprises a rectifier circuitry and a power switching converter circuitry, wherein the power switching converter circuitry is arranged downstream of the rectifier circuitry when looking from the power supply towards the at least one light source. Preferably the power switching converter circuitry comprises a galvanic insulation between a primary side and a secondary side thereof. The power switching converter circuitry may comprise e.g. a flyback converter, a buck converter, a boost converter, etc.

According to an exemplary embodiment, the drive means is arranged in a driver housing. The surge protection circuitry and the monitoring circuitry may be arranged in a pluggable surge protection module and the driver housing may be configured to receive the pluggable surge protection module such that the surge protection circuitry is connected to a power supply side of the drive means when plugged in. In that manner, the drive means is compact and flexible in terms of replacement and/or installation of the surge protection circuitry.

According to an exemplary embodiment, the driver housing is provided with at least two power 35 supply terminals, and a connection inside the driver housing connects the at least two power supply terminals with the surge protection circuitry when the pluggable surge protection module is plugged in. Alternatively, the surge protection module comprises the at least two power supply terminals, and a connection inside the pluggable module connects the at least two power supply terminals with the surge protection circuitry, and the at least two power supply terminals are connected to the drive means, when the pluggable surge protection module is plugged-in.

According to an exemplary embodiment, the driver housing may be provided with a further externally accessible receiving means configured for receiving a pluggable module comprising a further circuit. The further circuit may comprise circuitry allowing the luminaire driver to communicate using one or more protocols such as Communication Area Network (CAN), Digital Addressable Lighting Interface (DALI), Universal Asynchronous Receiver-Transmitter (UART), 1-10V, I2C, RS485, USB, Ethernet, Local Interconnect Network (LIN), Bluetooth, Bluetooth Low Energy (BLE), an analog communication protocol such as an analog 4-20 mA current loop protocol used for electronic signaling. The further circuit may be part of the transmission means described above.

Optionally, the receiving means is such that the further circuit is connected to driver circuitry when the pluggable module is plugged in the receiving means. Optionally the driver housing may be provided with at least one, preferably externally accessible, control input and/or output connector element connected to the further circuit of the pluggable module, when the pluggable module is plugged in the receiving means. The at least one externally accessible control input and/or output connector element may then be used to receive and/or send at least one further input and/or output signal using said one or more protocols. It is also possible to use a wireless protocol, such as EnOcean, Bluetooth Low Energy (BLE), ZigBee control, NFC (Near Field Communication), Sigfox, Narrow-Band Internet of Things (NB-IoT), LoRaWAN, Li-Fi control, Low-Power Wide-Area Network (LPWAN). In such an embodiment the control input and/or output connector element may be omitted.

According to a further aspect of the invention, there is provided a luminaire system comprising a support with at least one light source arranged thereon, a drive means configured for driving the at least one light source, a surge protection device between a power supply and the drive means, and an indicator light element. The surge protection device comprises surge protection circuitry and monitoring circuitry configured to monitor a malfunctioning of the surge protection circuitry and to provide an output signal based on said monitoring. The monitoring circuitry is connected such that a state of said indicator light element, e.g. an indicator LED, is changed when the output signal indicates a malfunctioning. The luminaire system further comprises a light guide arranged for guiding light of the indicator light element to a location which is visible for an operator or easily accessible for an operator.

For example, the light guide may extend from the indicator light element to a location on or near the support carrying the at least one light source, such that light passing through the light guide is emitted out of the luminaire system. In an embodiment where a transparent or translucent cover is arranged over the at least one light source, the light from the light guide may be emitted through the transparent or translucent cover. Alternatively, the luminaire housing may comprise a specific transparent or translucent indicator cover, and an end of the light guide may then be arranged in the luminaire housing, near the indicator cover. In yet other embodiment, the end of the light guide may be visible through another portion of the luminaire system. For example, the luminaire system may comprise a light module including the support, and a further module, e.g. a light ring module or another functional module, including the end of the light guide.

In another exemplary embodiment, the light guide may extend from the indicator light element to a location in the pole accessible to an operator, such as an area accessible via a door in the pole. In that manner, it is possible to use a standard SPD with an indicator light, at any invisible location inside the luminaire system, as the light guide will bring the light to a location which is visible for an operator or accessible for an operator.

Preferred and exemplary features described above for the various aspects of the invention, may also be combined with this further aspect.

According to a last aspect of the invention, there is provided a luminaire system comprising a support with at least one light source arranged thereon, a drive means configured for driving the at least one light source, a surge protection device between a power supply and the drive means, and a surge protection device activation detecting means configured to detect an activation of the surge protection device. This allows obtaining information related to the activation of the surge protection device. In that manner preventive maintenance can be done, and/or diagnostic information can be obtained, and/or a data analysis may be done.

Preferably, the luminaire system comprises a determining means configured to determine how many time the surge protection device has been activated and/or when the surge protection device was activated, based on data obtained by the surge protection device activation detecting means.

Optionally, the indicator device may be configured to indicate information related to the activation of the surge protection device, e.g. when the surge protection device was activated and/or how many times the surge protection device was activated.

Preferably, the surge protection device activation detecting means comprises a light sensor. More preferably, the surge protection device comprises a gas discharge tube (GDT) and the light sensor is configured and arranged to detect light emitted by the surge protection device upon activation thereof. When the GDT is activated, it produces light (typically a spark in a semi-transparent tube) which can be detected by the light sensor. The light sensor may be e.g. a photodiode.

Preferred and exemplary features described above for the various aspects of the invention, may also be combined with this last aspect.

BRIEF DESCRIPTION OF THE FIGURES

The accompanying drawings are used to illustrate presently preferred non-limiting exemplary embodiments of luminaire drivers and systems of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1A:
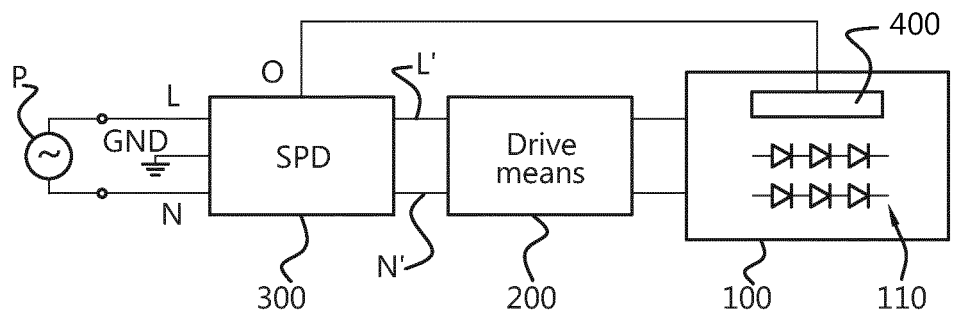
FIGS. 1A and 1B are schematic views of exemplary embodiments of a luminaire system with an SPD connected in series and in parallel, respectively, and with an indicator device for indicating a malfunctioning of the SPD which is powered by the output signal of the SPD.

FIGS. 1A-1B, 2A-2B, 3, and 5 illustrate exemplary embodiments of a luminaire system according to the first aspect. The luminaire system comprises a support 100, typically a PCB, with at least one light source 110 arranged thereon, a drive means 200 configured for driving the at least one light source 110, a surge protection device (SPD) 300 between a power supply P and the drive means 300, and an indicator device 400. Typically, the at least one light source 110 comprise a plurality of LEDs connected in series and/or in parallel. The indicator device 400 may also be arranged on the support 100, i.e. on the same support as the support on which the at least one light source is arranged.

The drive means 200 for the at least one light source 110, typically in the form of a LED driver, may be arranged in or on a luminaire head, in or on the luminaire pole, or in any other suitable location of the luminaire system. The SPD 300 is provided in order to leverage the benefit of long life of the at least one light source, typically a plurality of LEDs. The SPD 300 protects the drive means 200 against surge events. The drive means 200 may be configured to convert an AC voltage in a DC drive current for the at least one light source.

Figure 5:
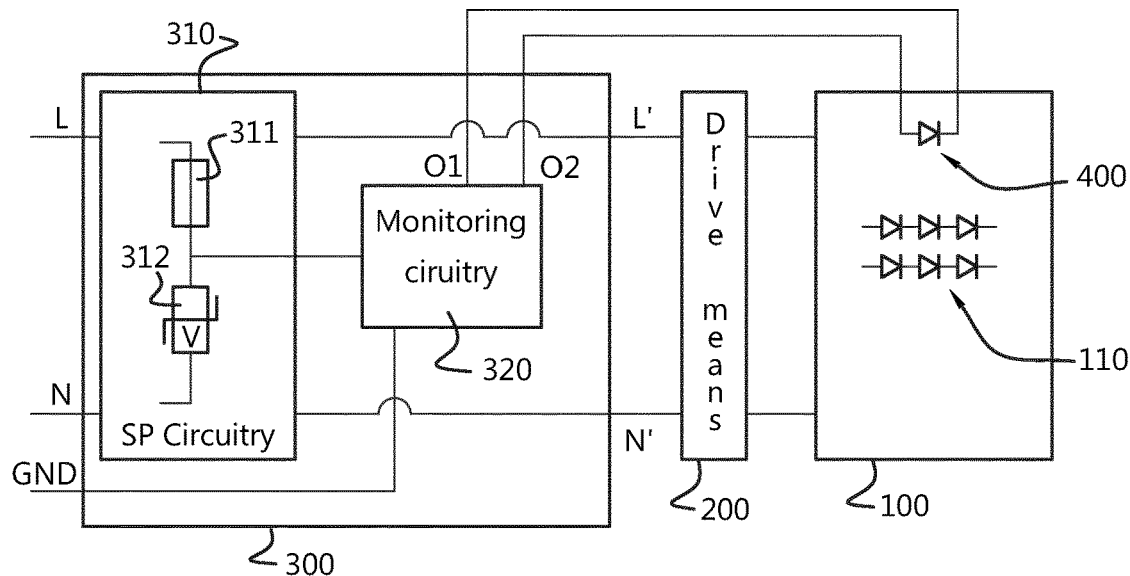
FIG. 5 is a detailed schematic view of a possible implementation of the exemplary embodiment of FIG. 1A.

As is shown in FIG. 5, the SPD 300 comprises surge protection circuitry 310 and monitoring circuitry 320 configured to monitor a malfunctioning of the surge protection circuitry 310. The monitoring circuitry 320 is configured to provide an output signal based on said monitoring. In FIGS. 1A-1B, 2A-2B, and 3 only one output terminal O for the output signal is shown, but the output signal may also be a voltage signal provided between two output terminals O1 and O2 as shown in FIG. 5. The monitoring circuitry 320 is connected such that said indicator device 400 is activated or deactivated when the output signal indicates a malfunctioning.

The surge protection circuitry 310 and the monitoring circuitry 320 may be arranged in the same housing, and the housing may provided with at least a first and a second power terminal L, N for connecting the surge protection circuitry 310 to the power supply P, and with at least one output terminal O for outputting the output signal. The first and a second power terminals L, N may also be called a voltage line terminal L and a neutral terminal N of an electrical distribution grid terminal. Optionally, also a ground or equipotential terminal GND may be provided. When it is desirable to connect the SPD 300 in series, as in the embodiments of FIGS. 1A, 2A, 3, and 5, also a third and a fourth power supply terminal L', N' leading to the drive means 200 may be provided.

Figure 1B:
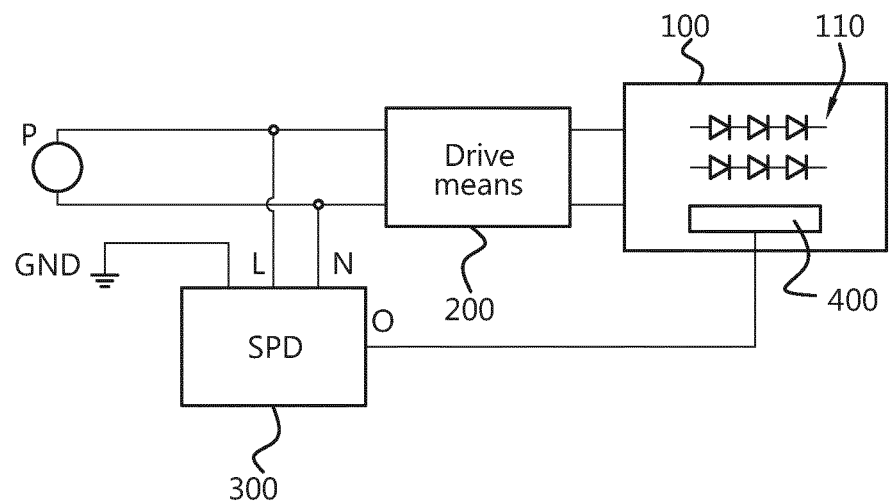

In the embodiment of FIGS. 1A-1B and 5 the monitoring circuitry 320 is connected such that the output signal is provided to the indicator device 400, such that the indicator device 400 is activated or deactivated when the output signal indicates a malfunctioning. For example, as shown in FIG. 5, the monitoring circuit 320 may be configured to provide, as an output signal, a voltage having a level which is suitable to power the indicator device 400 when a malfunction is detected, whilst the voltage level is not adapted to power the indicator device 400 when the SPD 300 operates normally, or vice versa. It is noted that a powered device may either indicate a correct functioning or may indicate a malfunctioning, depending on what is agreed upon. For example, a powered red light may indicate a malfunctioning, whilst a powered green light may indicated a normal functioning of the surge protection circuitry.

FIGS. 1A and 5 illustrate an SPD 300 connected in series. When connected in series, the first and a second power terminal L, N is connected to a first and a second power supply line leading to the power supply P, and the third and fourth power terminal L', N' are connected to a third and a fourth power supply line leading to the drive means 200. FIG. 1B illustrates an SPD 300 connected in parallel. When connected in parallel, the first and a second power terminal L, N are connected to a first and a second power supply line between the power supply P and the drive means 200. Note that the GND terminal is optional.

Figure 2A:
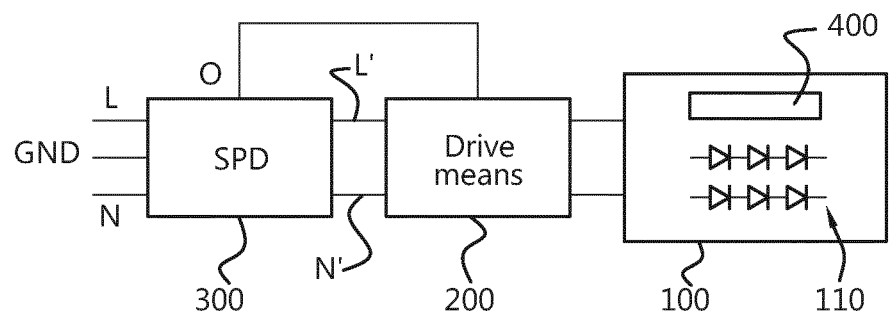
FIGS. 2A and 2B are schematic views of exemplary embodiments of a luminaire system with an SPD connected in series and in parallel, respectively, and with an indicator device which is powered by drive means.
Figure 2B:
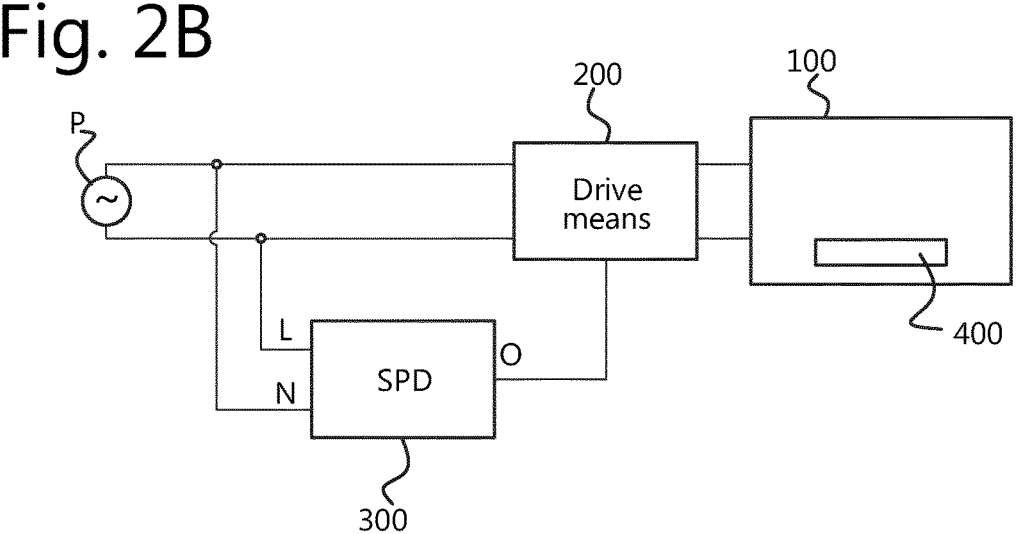

In the embodiment of FIGS. 2A and 2B, the monitoring circuitry 320 is connected such that the output signal is provided to drive and/or control circuitry of the drive means 200. Such drive and/or control circuitry may be configured for driving the indicator device 400 based on the received output signal, such that a state of said indicator device 400 is changed (e.g. from an inactive to an activate state) when the output signal indicates a malfunctioning. As the drive means 200 also drive the at least one light source 110, such a solution may be advantageous in terms of required connections. FIG. 2A illustrates an SPD 300 connected in series and FIG. 2B illustrates an SPD 300 connected in parallel.

Figure 3:
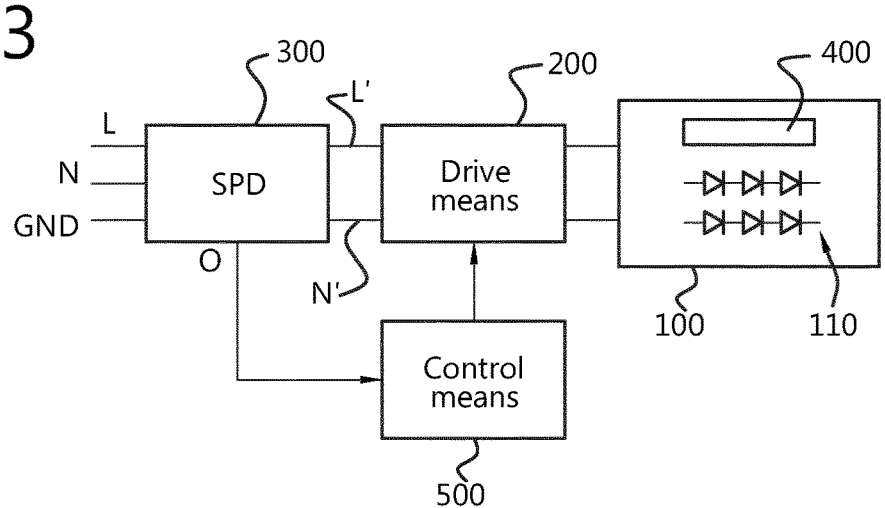
FIG. 3 is a schematic view of an exemplary embodiment of a luminaire system with an SPD and with an indicator device which is powered by drive means controlled by control means.

In the embodiment of FIG. 3, the monitoring circuitry 320 is connected such that the output signal is provided to a control means 500 configured for controlling the drive means 200 based on said output signal. The drive means 200 is configured to drive the indicator device 400 such that a state of said indicator device is changed when the output signal indicates a malfunctioning. The drive means 200 may be included in a driver having a driver housing, and the control means 500 may be provided in a controller separate from the driver housing or in the driver housing. The drive means 200 and/or the controller 500 may be provided in the luminaire housing. However, in other embodiments, the control means 500 may be included in a separate controller outside the luminaire housing, e.g. a controller connected to a luminaire housing through a socket such as a NEMA or Zhaga socket.

According to an exemplary embodiment the monitoring circuitry 320 is configured to monitor a malfunctioning of the surge protection circuitry 310 and to provide an output signal based on said monitoring, when the at least one light source 110 is off. For example, the control means 500 may control the drive means 200 such that the at least one light source is switched off whilst the indicator device 400 is controlled in function of the output signal. In that manner, it is possible to check the functioning of the surge protection circuitry of a luminaire during daytime e.g. during working hours, when the at least one light source 110 is off.

The indicator device 400 may comprise at least one LED. The indicator device may be configured to emit red light to indicate a malfunctioning, and so that it can be easily distinguished from the color of the at least one light source 110 which is usually a warm or cold white. However, the at least one indicator LED may also be configured to emit another color, e.g. green or blue. For example, the indicator LED could emit green light in a normal state of the SPD and may be deactivated when a malfunctioning is detected. Also, the indicator device could be a flash light and/or a visible light source other than LED (e.g. laser, UV, IR, etc.). In a possible embodiment, the support 100 is part of a luminaire head and a transparent or translucent cover (not shown) is arranged over the at least one light source 110. For example, the at least one transparent or translucent cover may form a portion of the luminaire housing in which the support 100 is arranged. The at least one indicator LED 400 may also emit through the transparent or translucent cover or through a separate indicator cover. Optionally a small portion of the transparent or translucent cover or of the indicator cover or of an optical element opposite the at least one indicator LED is provided in a color, such that this colored portion lights up when the at least one indicator LED 400 is activated.

Figure 4:
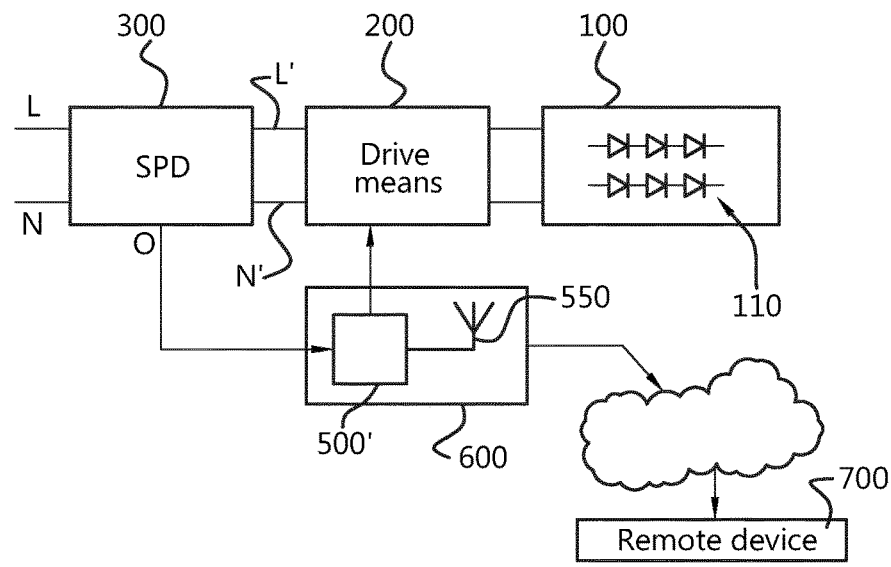
FIG. 4 is a schematic view of an exemplary embodiment of a luminaire system with an SPD which provides an output signal to a transmissions means.

FIG. 4 illustrates an embodiment of a luminaire system according to the second aspect. The luminaire system comprises a support 100 with at least one light source 110 arranged thereon, a drive means 200 configured for driving the at least one light source 110, a surge protection device 300 between a power supply P and the drive means 200, and a transmission means 600. The surge protection device 300 comprises surge protection circuitry (not shown) and monitoring circuitry (not shown) configured to monitor a malfunctioning of the surge protection circuitry and to provide an output signal based on said monitoring at at least one output terminal O. The monitoring circuitry is connected such that the output signal can be provided to the transmission means 600 and the transmission means 600 is configured for transmitting a malfunction message to a remote device 700 based on the output signal. By transmitting malfunction messages to a remote device, an appropriate action can be taken to replace the SPD 300.

The transmission means 600 may comprise control means 500' and an antenna 550. The remote device 700 may be any device remote from the luminaire system, e.g. a remote server, a mobile device (such as a smartphone, tablet or laptop), another luminaire system, etc. The transmission by the transmissions means 600 may be done using a long-distance communication protocol or using a short-distance communication protocol. For example, the transmission may be done through a cellular network or may be done through a mesh network. In a possible embodiment, the transmission by the transmissions means 600 is done using a short-distance communication protocol and the malfunction message is sent to a nearby other luminaire system. This nearby other luminaire system may then be configured with a transmission means configured to communicate the message using a long-distance communication protocol to another remote device, e.g. a remote server and/or a mobile device. In another possible embodiment, the transmission by the transmissions means 600 is done directly to a remote device, such as a mobile device or a remote server, using a long-distance communication protocol. The transmission to a nearby mobile device may also be done using a short-distance communication protocol, such as Bluetooth.

The transmission means 600 and the drive means 200 may be included in a driver having a single driver housing. However, in other embodiments, the transmission means 600 may be included in a separate controller, e.g. a controller connected to a luminaire housing through a socket such as a NEMA or Zhaga socket.

The malfunction message may be automatically sent by the transmission means 600, when the output signal indicates a malfunctioning. For example, a message could be automatically sent at specific moments in time (e.g. when the luminaire is switched on) with an indication on whether the surge protection circuitry is still working or not. Alternatively or in addition, the transmission means 600 may be configured to receive a request for information about the functioning of the SPD 300 from a remote device 700, and to send in response a malfunction message comprising an indication whether or not there is a malfunctioning of the SPD 300 based on the output signal to the remote device. In other words, a push mechanism and/or a pull mechanism may be used to transmit the malfunction message from the transmissions means 600 to a remote device 700.

Figure 6:
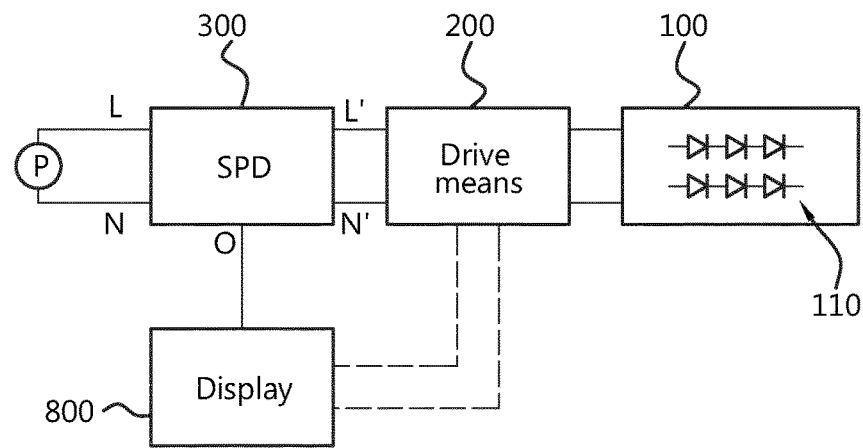
FIG. 6 is a schematic view of an exemplary embodiment of a luminaire system with an SPD which provides an output signal to a display.
Figure 7:
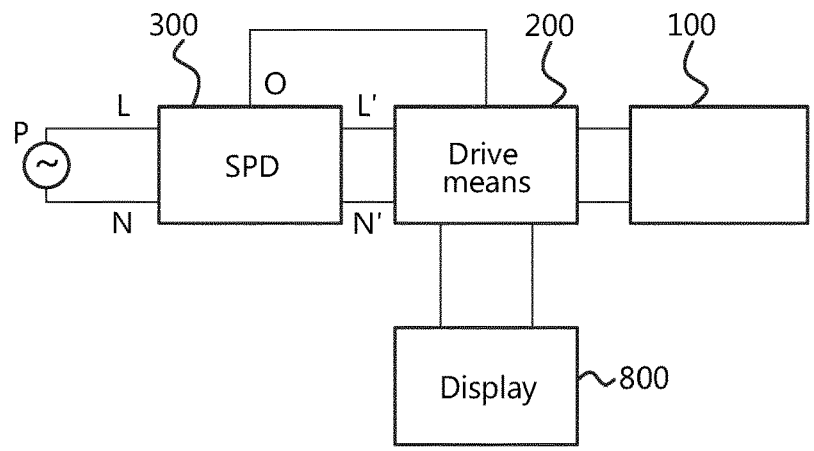
FIG. 7 is a schematic view of an exemplary embodiment of a luminaire system with an SPD which provides an output signal to a drive means for driving a display.
Figure 8:
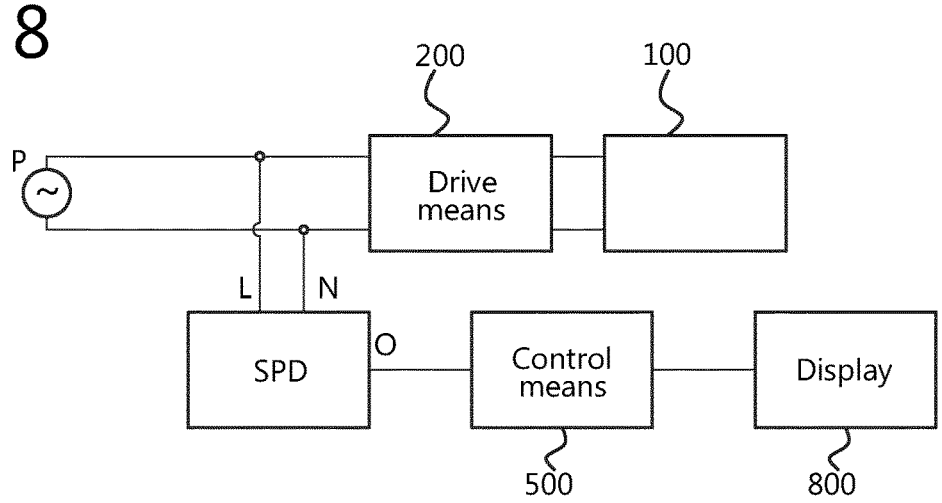
FIG. 8 is a schematic view of an exemplary embodiment of a luminaire system with an SPD which provides an output signal to a control means for controlling a display.

FIGS. 6-8 illustrate exemplary embodiments of a luminaire system according to a third aspect. The luminaire system comprising a support 100 with at least one light source 110 arranged thereon, a drive means 200 configured for driving the at least one light source 110, an SPD 300 between a power supply P and the drive means 200, and a display 800. The SPD 300 may be connected in parallel as illustrated in FIG. 8 or in series as illustrated in FIGS. 6 and 7. The SPD 300 comprises surge protection circuitry (not shown) and monitoring circuitry (not shown) configured to monitor a malfunctioning of the surge protection circuitry and to provide an output signal based on said monitoring at an output O. The monitoring circuitry is connected such that a message is indicated on the display 800 when the output signal indicates a malfunctioning. In FIGS. 6-8 only one output terminal O for the output signal is shown, but the output signal may also be a voltage signal provided between two output terminals O1 and O2 as explained above.

The display 800 may be present in the luminaire system for other purposes. For example, the main purpose of the display 800 could be to display information, such as environmental information, advertisements, information about the area, etc. The display 800 may be provided to any component of the luminaire system. For example, the display 800 may be integrated in, positioned in, or provided to a luminaire pole of the luminaire system, a component such as a cabinet associated with the luminaire, e.g. attached to the luminaire pole or located adjacent the luminaire pole, a luminaire head, a luminaire module, e.g. a module of a modular luminaire comprising a plurality of modules arranged one above the other, etc. The display 800 may be a touch-screen device. The display 800 may be configured to display certain information upon request. For example, the display 800 may display a main menu allowing a user to select the information to be displayed on the display 800.

The message which is displayed on the display 800 for indicating the malfunctioning of the SPD 300 may be e.g. a symbol, a color, a text message, etc. The message may be displayed automatically when the output signal indicates a malfunctioning, or it may be displayed upon request, e.g. when an operator requests to display the status of the SPD.

In the embodiment of FIG. 6 the output O is connected to the display 800 such that said display 800 can indicate a malfunctioning when the output signal indicates a malfunctioning.

In the embodiment of FIG. 7 the output O is connected to drive and/or control circuitry of the drive means 200. The driver and/or control circuitry is configured for driving and controlling the display 800 based on the output signal, such that a suitable message is displayed on the display 800, either automatically or on request of a user.

In the embodiment of FIG. 8 the output O is connected to a control means 500 configured for controlling the display 800 based on the output signal such that the display 800 indicates a malfunctioning when the output signal indicates a malfunctioning. Such control means 500 may also control any other image data to be displayed.

It is noted that the embodiments of FIGS. 1-8 may be combined. For example, a luminaire system according to any one of the FIGS. 1-3, and 6-8 may further comprise a transmission means 600 configured for transmitting a malfunction message to a remote device 700 based on the output signal.

FIGS. 9-12 illustrate exemplary embodiments of an SPD for use in luminaire systems of the invention.

Figure 9:
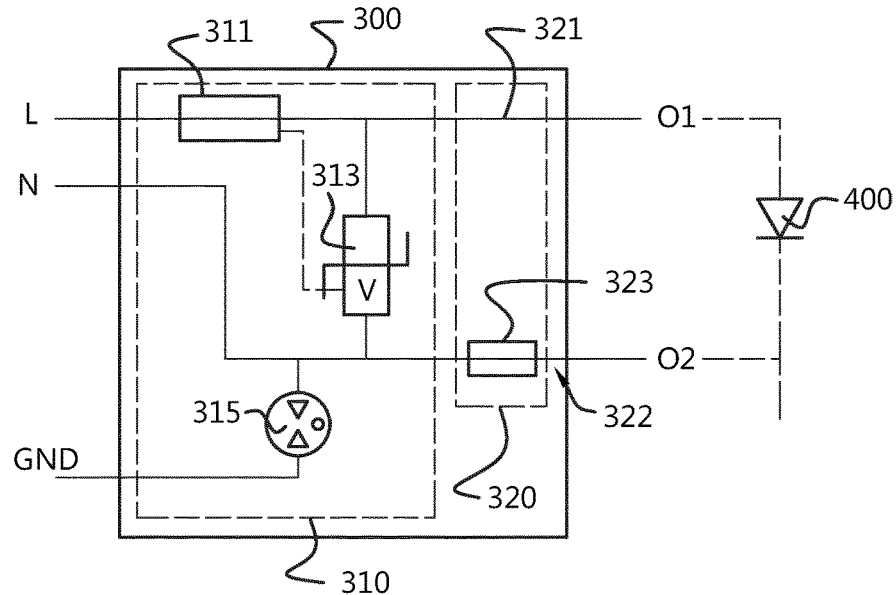
FIGS. 9-12 are circuit diagrams illustrating exemplary embodiments of an SPD for use in luminaire systems of the invention.

FIG. 9 illustrates an SPD 300 comprising surge protection circuitry 310 and monitoring circuitry 320. The surge protection circuitry 310 comprises a thermal fuse 311, a metal oxide varistor (MOV) 313, and a gas discharge tube (GDT) 315. The thermal fuse 311 and the MOV 313 are connected in series between the terminal L and the terminal N. The gas tube 315 is connected between terminal N and the GND terminal. The MOV 313 is configured to absorb energy from an excess voltage caused by a voltage surge. The MOV 313 clamps the voltage between the terminals L, N to a predetermined maximum voltage that is selected to be within the limits required by the drive means. The thermal fuse 311 will open when the temperature caused by an excess current exceeds a predetermined threshold. In that way the MOV 313 is protected from high currents. The threshold may be selected to open the thermal fuse 311 before the heat generated is so high as to cause failure of the MOV 313 that could damage other components of the drive means. GDT 315 creates an effective short circuit when triggered, so that if any electrical energy (spike, signal, or power) is present on terminal N, the GDT 315 will short this. Once triggered, a GDT 315 will continue conducting until all electric current sufficiently diminishes, and the gas discharge quenches.

The monitoring circuitry 320 comprises a line 321 connecting an intermediate node between the thermal fuse 311 and the MOV 313 to an output terminal O1. The monitoring circuitry 320 further comprises a line 322 with a resistor 323 connecting terminal N to a second output terminal O2. When an indicator LED 400 is connected between O1 and O2 it will be on in normal operation and it will be off when the SPD 300 fails.

Figure 10:
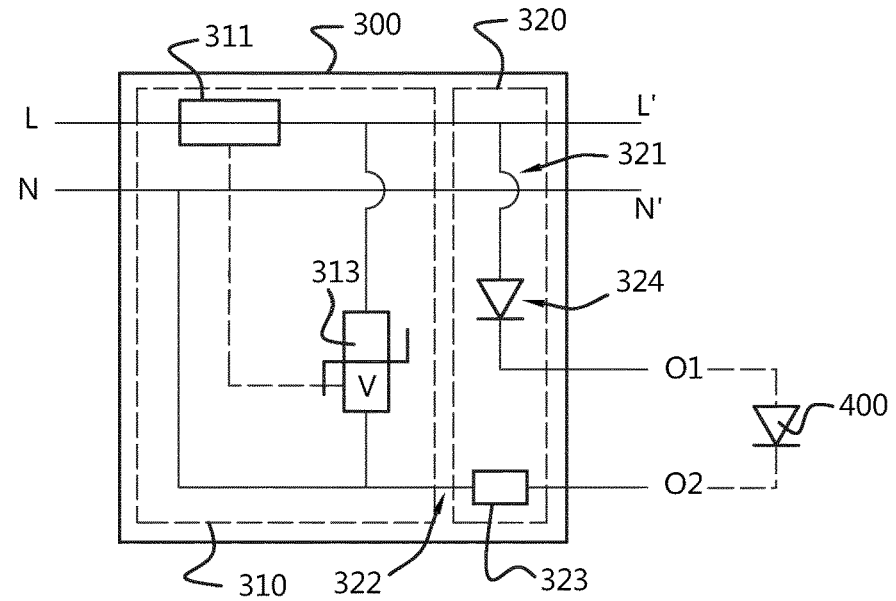

FIG. 10 illustrates an embodiment which is similar to the embodiment of FIG. 9 with this difference that the SPD 300 is intended for being connected in series and that it does not comprise a GDT. Further a diode 324 is included in line 321. It is noted that in a simple embodiment the monitoring circuitry 320 may comprise only the two lines 321 and 322 without resistor 323 and diode 324.

Figure 11:
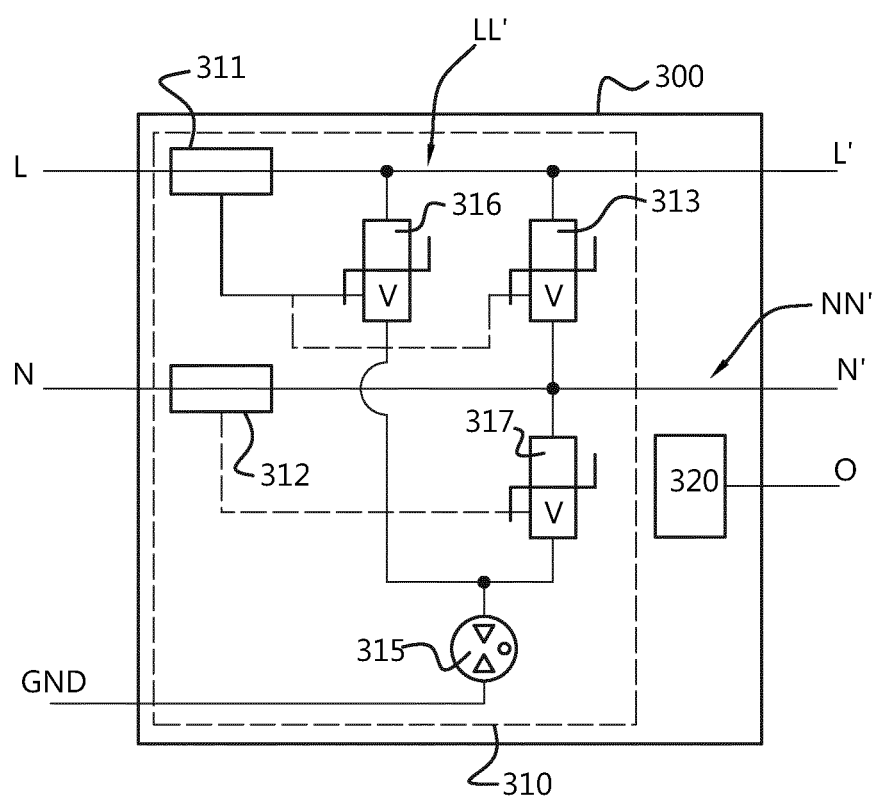

FIG. 11 illustrates a further developed embodiment of an SPD 300 comprising surge protection circuitry 310 and monitoring circuitry 320. The surge protection circuitry 310 comprises two thermal fuses 311, 312 three MOVs 313, 316, 317 and a GDT 315. The thermal fuses 311, 312 and the MOV 313 are connected in series between the terminal L and the terminal N with a first thermal fuse 311 being included in a first line LL' between terminal L and L', and a second thermal fuse 312 being included in a second line NN' between terminal N and N' and with MOV 313 being included between the first and second line, downstream of the thermal fuse 311 and upstream of thermal fuse 312. A series connection of MOV 316 and GDT 315 is connected between the first line LL' (downstream of thermal fuse 311) and the GND terminal. Further a series connection of MOV 317 and GDT 315 is present between the second line NN' (downstream of thermal fuse 312) and the GND terminal. By including in the SPD 300 both a thermal fuse 311 connected to terminal L and a thermal fuse 312 connected to terminal N, and by providing three MOVs 313, 316, 317, both differential surges as well as common mode surges can be dealt with efficiently.

Figure 12:
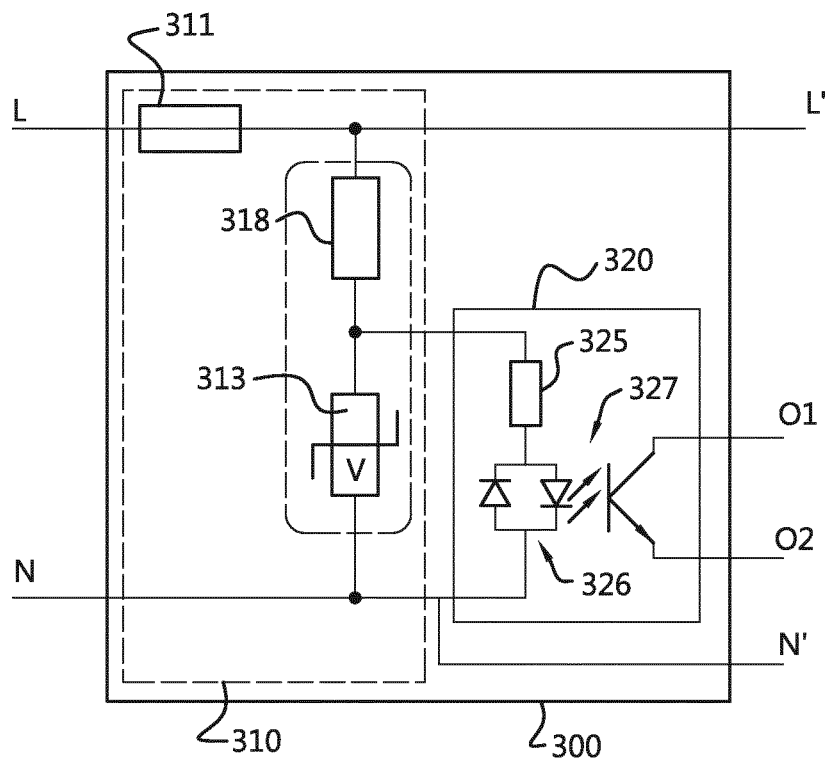

FIG. 12 illustrates yet another exemplary embodiment of an SPD 300 comprising surge protection circuitry 310 and monitoring circuitry 320. The surge protection circuitry 310 comprises two thermal fuses 311, 318 and a MOV 313. The thermal fuses 311, 318 and the MOV 313 are connected in series between the terminal L and the terminal N with a first thermal fuse 311 being included in a first line LL' between terminal L and L', and a second thermal fuse 312 being connected in series with MOV 313 between the first line LL', downstream of the thermal fuse 311, and terminal N. The second thermal fuse 312 and MOV 318 may be provided in an integrated manner as a thermally protected MOV. The monitoring circuitry 320 comprises a monitoring line with a series connection of a resistor 325 and two anti-parallel LEDs 326, said line being connected in parallel with MOV 313. The monitoring circuitry 320 further comprises an opto-coupler 327 with phototransistor connected to output terminals O1, O2. In that way a galvanic isolation is provided to isolate a connection to the surge protection circuitry from the output terminals O1, O2. When thermal fuse 311 or 318 breaks, the current in monitoring line is interrupted and the phototransistor of the opto-coupler 327 no longer conducts. In other words, the internal impedance seen between O1 and O2 changes from low to high upon failure.

By suitably connecting O1 and O2 of the embodiments of FIGS. 9-12 with an indicator device 400 and/or with a display 800 and/or with a drive means 200 and/or with a control means 500 and/or with a transmissions means 600, a failure message or indication can be provided.

Figure 13:
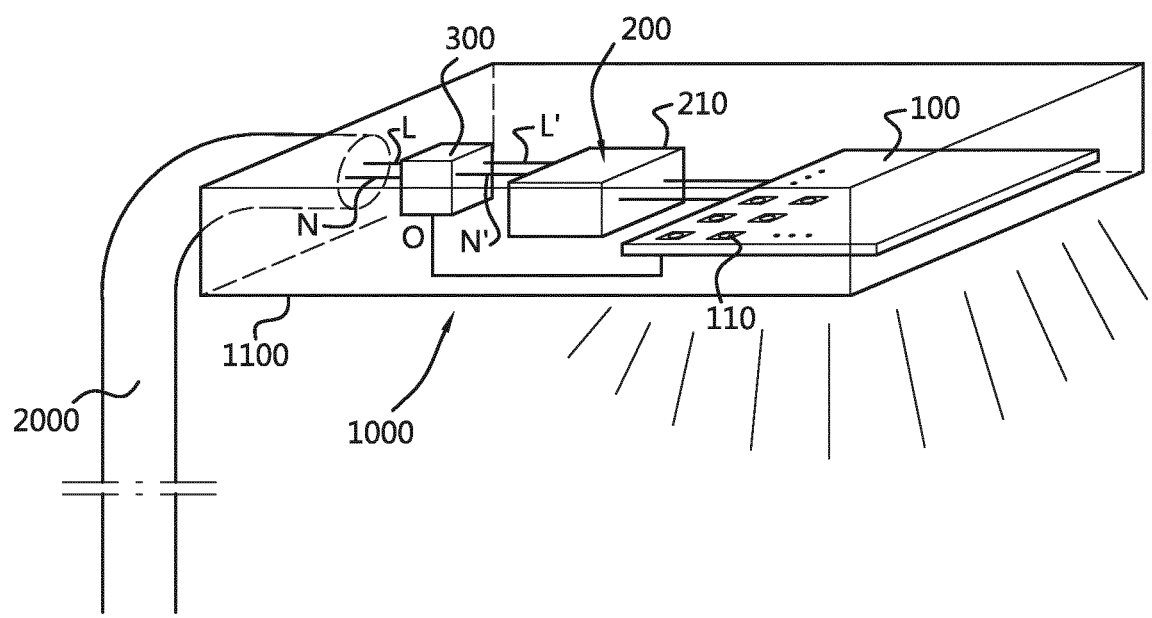
FIG. 13 is a schematic view of an exemplary embodiment of a luminaire system with a luminaire head and a pole.

FIG. 13 illustrates an exemplary embodiment of a luminaire system. The luminaire system comprises a luminaire head 1000 and a luminaire pole 2000. The luminaire head 1000 may be connected in any manner known to the skilled person to the luminaire pole 2000. In other non-illustrated embodiments, a luminaire head 1000 may be connected to a wall or a surface, e.g. for illuminating buildings or tunnels. The luminaire head 1000 comprises a luminaire housing 1100 in which an SPD 300, a drive means 200 and a support 100 with a plurality of LEDs 110, are arranged. In another embodiment, the SPD 300 and/or the drive means 200 may be provided in the pole 2000 or outside of the luminaire housing 1100.

The drive means 200 typically includes a galvanic insulation between the mains input circuitry (the so called 'primary circuit') and the secondary circuit including the plurality of light sources 110. Looking in a downstream direction from the power supply input connector elements towards the output connector elements, the driver means 200 typically comprises an EMC filtering circuitry, a rectifier and smoothing circuitry, a power factor correction circuitry, and an isolated power switching converter circuitry. The EMC filtering circuitry may be designed to filter out high frequency noise generated by the isolated power switching converter circuitry. The rectifier and smoothing circuitry may include one or more components, such as diodes, transistors, capacitors, and/or resistors, arranged to rectify and/or filter the voltage between the first and second power supply input connector elements. The rectifier circuitry may include e.g. a passive diode bridge rectifier. The rectifier circuitry may further include one or more components arranged to smoothen and/or otherwise condition the rectified DC voltage. The power factor correction circuitry may include a passive component such as inductor and capacitor. It might also include an active component such as transistor or integrated circuit. The isolated power switching converter circuitry includes a transformer with at least one primary side winding and at least one secondary side winding, preferably with a galvanic insulation between the primary side and the secondary side. The isolated power switching converter circuitry may comprise e.g. a flyback converter, a buck converter, a boost converter, etc. The converter circuitry is configured to drive the at least one light source 110, but may also be configured to drive one or more other components of the luminaire system. The converter circuitry may comprise voltage-to-current converter circuitry configured for generating a drive current for the at least one light source 110, as well as other converter circuitry configured for generating a drive current or voltage suitable for driving the one or more other components, e.g. a sensor, a camera, a controller, etc. Optionally the drive means 200 may further comprise dimming circuitry configured to be controlled in function of a dimming control signal which may be received in a wireless or wired manner from a control means arranged inside or outside of the driver housing 210, and/or possibly even at a remote location.

The luminaire housing 1100 may be formed as a metal casing with a transparent or translucent cover allowing light emitted by the LEDs 110 to be emitted out of the luminaire housing 1100.

The drive means 200 may be included in a driver housing 210 that may be provided with an externally accessible receiving means configured for receiving one or more pluggable modules comprising a further circuit, said receiving means being such that the further circuit is connected to the driver circuitry when the pluggable module is plugged in the receiving means. More in particular, the SPD 300 may be implemented as a pluggable surge protection module. Also, the driver housing 210 may be provided with a least one, preferably externally accessible, connector element connected to the further circuit of the pluggable module, when the module is plugged in the receiving means. Using such pluggable module, the luminaire driver may be provided with an enhanced functionality and/or suitability for a large class of target devices in a flexible manner, whilst avoiding a significant increase of the cost and volume. Such embodiments have been described in detail in patent application PCT/EP2017/065304 filed on 21 Jun. 2017 in the name of the applicant, which is included here in its entirety by reference.

The drive means 200 may also comprise control circuitry configured for controlling the converter circuitry, and in particular one or more switching elements of the converter circuitry, in function of a control signal received through a control connector element. The control signal may be a light control signal, e.g. a dimming control signal, such as a measured light intensity. The duty cycle and/or the frequency of the switching of the switching element may then be controlled in function of the received control signal to adjust the light emitted by the at least one light source 110. Additional control connector elements may be provided in order to input or output other control signals. The control connector elements may be integrated in the driver housing 210 and may be accessible from outside of the driver housing 210.

Figure 14A:
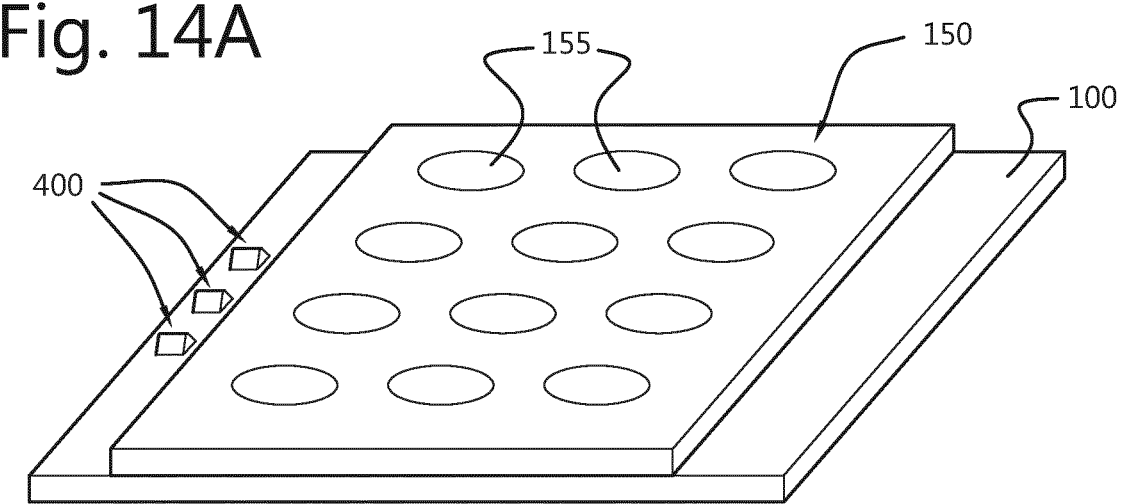
FIGS. 14A and 14B are a schematic perspective view and a cross section of an exemplary embodiment of a support with indicator device.
Figure 14B:
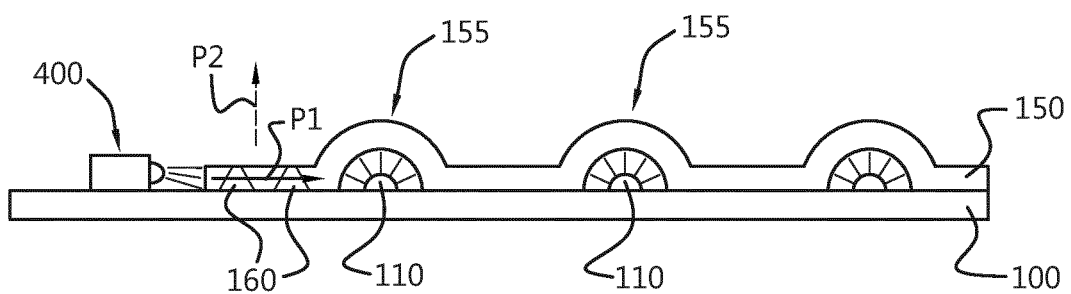

FIGS. 14A and 14B are a schematic perspective view and a cross section of an exemplary embodiment of a luminaire system with a support 100, typically a PCB, on which a plurality of light sources 110 and an indicator device 400 are arranged. The indicator device 400 may be connected to an SPD 300 or to a drive means 200 in any one of the manners that have been described above. The luminaire system further comprises an optical plate 150, here a lens plate, arranged opposite the plurality of light sources 110, typically a plurality of LEDs, on the support 100. It is noted that each light source 110 may comprise one or more LEDs. The lens plate 150 comprises a plurality of lens elements 155 associated with the light sources 110. In a possible embodiment, the indicator device 400 comprises at least one indicator light element 400, e.g. a side LED, arranged to emit light into or through a peripheral edge of the optical plate 150, such that the light of the at least one indicator light element 400 travels in the optical plate 150 as indicated with the arrow P1. Some of the light of the at least one indicator light element 400 will leave the optical plate 150 and will be visible for an operator looking at the light sources 110. Optionally, the optical plate 150 may be provided with light guiding elements 160, e.g. in the form of recesses or protrusions in the optical plate 150, guiding the light from the at least one indicator light element 400 out of the luminaire system in the direction of arrow P2, so that it is even better visible for an operator.

Figure 15:
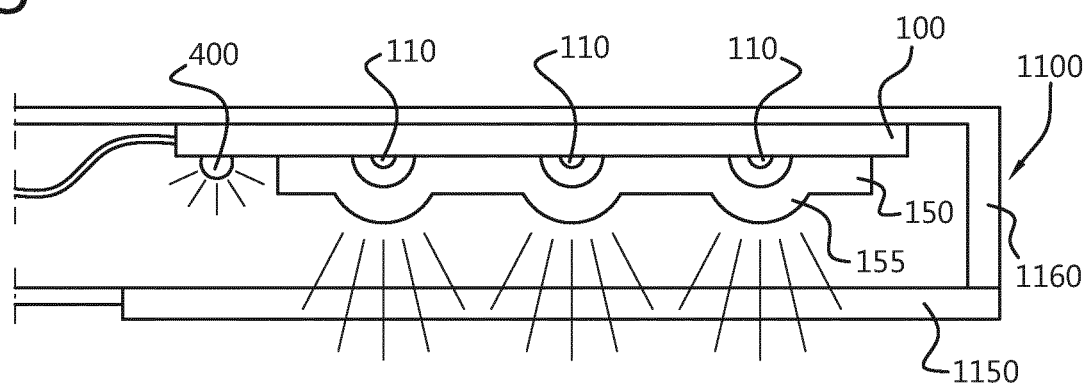
FIG. 15 is a schematic cross section of another exemplary embodiment of a support with indicator device contained in a luminaire housing.
Figure 16:
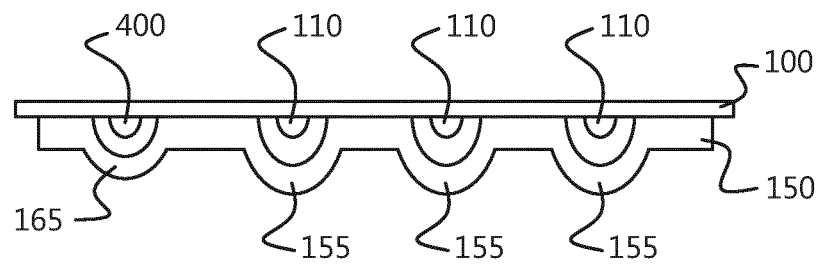
FIG. 16 is a schematic cross section of yet another exemplary embodiment of a support with indicator device.

FIG. 15 is a schematic cross section of another exemplary embodiment of a luminaire system with a support 100, typically a PCB, on which a plurality of light sources 110 and an indicator device 400 are arranged. The indicator device 400 may be connected to an SPD 300 or to a drive means 200 in any one of the manners that have been described above. The luminaire system further comprises an optical plate 150, here a lens plate, arranged opposite the plurality of light sources 110, typically a plurality of LEDs, on the support 100. It is noted that each light source 110 may comprise one or more LEDs. The lens plate 150 comprises a plurality of lens elements 155 associated with the light sources 110. In a possible embodiment, the indicator device 400 comprises at least one indicator light element 400 arranged on the support 100. The support 100 with associated optical plate 150 is arranged in a luminaire housing 1100. The luminaire housing 1100 comprises a transparent or translucent cover 1150, and the light sources 110 emit light through the cover 1150. The at least one indicator light element 400 is also arranged on the support 100 to emit light through the cover 1150. FIG. 16 is a schematic cross section of another variant of a support 100 with indicator device 400, which could be used in the luminaire housing 1100 of FIG. 15. In the variant of FIG. 16, the optical plate 150 comprises a plurality of optical elements 155, e.g. lens elements 155 associated with the plurality of light sources 110, as well as at least one optical element 165, e.g. at least one lens element 165, associated with the at least one indicator light element 400. The optical element 165 may be identical to or different from the optical element 155. In a specific embodiment, the optical element 165 may be a colored element.

Figure 17:
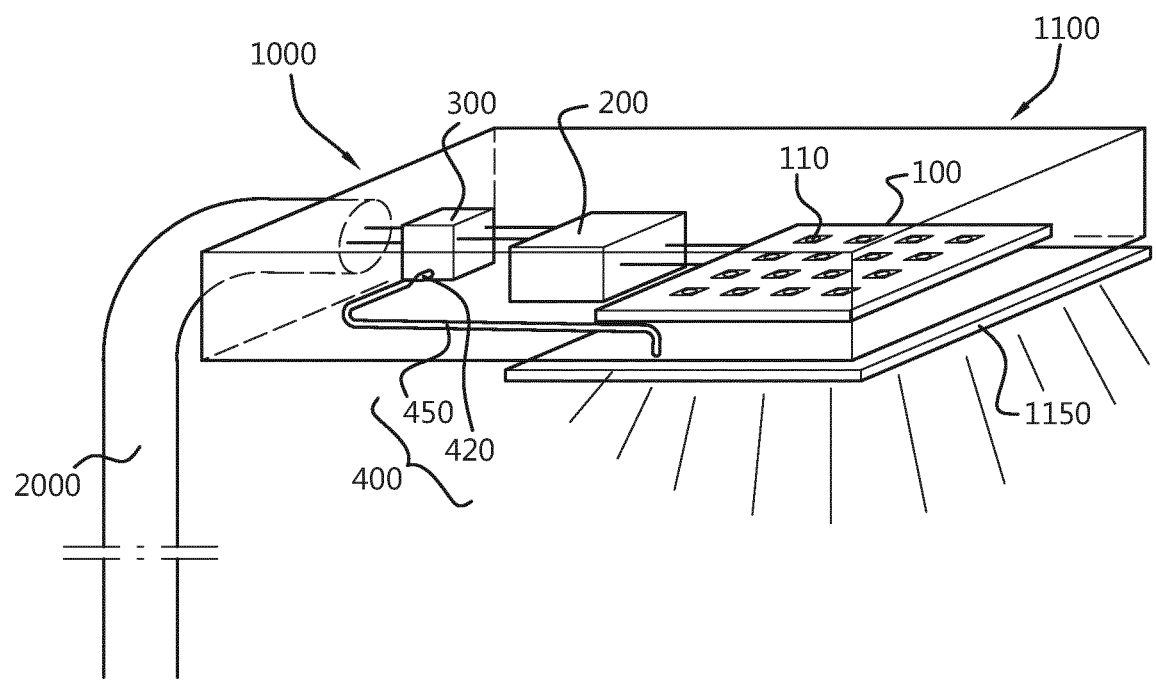
FIG. 17 is a schematic view of another exemplary embodiment of a luminaire system with a luminaire head and a pole.

FIG. 17 is a schematic view of another exemplary embodiment of a luminaire system with a luminaire head 1000 and a pole 2000. In other non-illustrated embodiments, a luminaire head 1000 may be connected to a wall or a surface without the need for a pole 2000. The luminaire head 1000 comprises a luminaire housing 1100 in which an SPD 300, a drive means 200 and a support 100 with a plurality of light sources 110 arranged thereon. The SPD 300 is provided with an indicator light 420. In another embodiment the SPD 300 and/or the drive means 200 may be provided in the pole 2000. The luminaire housing 1100 may be formed as a casing 1160 with a transparent or translucent cover 1150 allowing light emitted by the light sources 110 to be emitted out of the luminaire housing 1100. The SPD 300 comprises surge protection circuitry and monitoring circuitry configured to monitor a malfunctioning of the surge protection circuitry and to provide an output signal based on said monitoring. The monitoring circuitry is connected such that a state of the indicator light 420, e.g. an indicator LED, is changed when the output signal indicates a malfunctioning. The luminaire system further comprises a light guide 450 arranged for guiding light of the indicator light 420 to a location which is visible for an operator or easily accessible for an operator. In the illustrated example of FIG. 17, the indicator light 420 and the light guide 450 constitute an indicator device 400 arranged at a location which is such that the state of the indicator device 400 is visible from outside of the luminaire housing, through the cover 1150. The light guide 450 extends from the indicator light 420 to a location on or near the support 100 and at or near the cover 1150, such that light passing through the light guide 450 is emitted through the cover 1150 out of the luminaire system. The light guide 450 may also be arranged to emit light into or through a peripheral edge of an optical plate (not visible in FIG. 17) arranged over the light sources 110, similar to the embodiment of FIG. 14B, such that the light of the indicator light 420 travels through the light guide 450 into the optical plate. Optionally, the optical plate may be provided with light guiding elements guiding the light from the light guide 450 out of the luminaire system through the cover 1150, so that it is even better visible for an operator. In another non-illustrated exemplary embodiment, the light guide 450 could extend from the indicator light 420 to a location in the pole 2000 accessible to an operator, such as an area near ground level accessible via a door in the pole 2000 or to another location of the luminaire housing.

Figure 18:
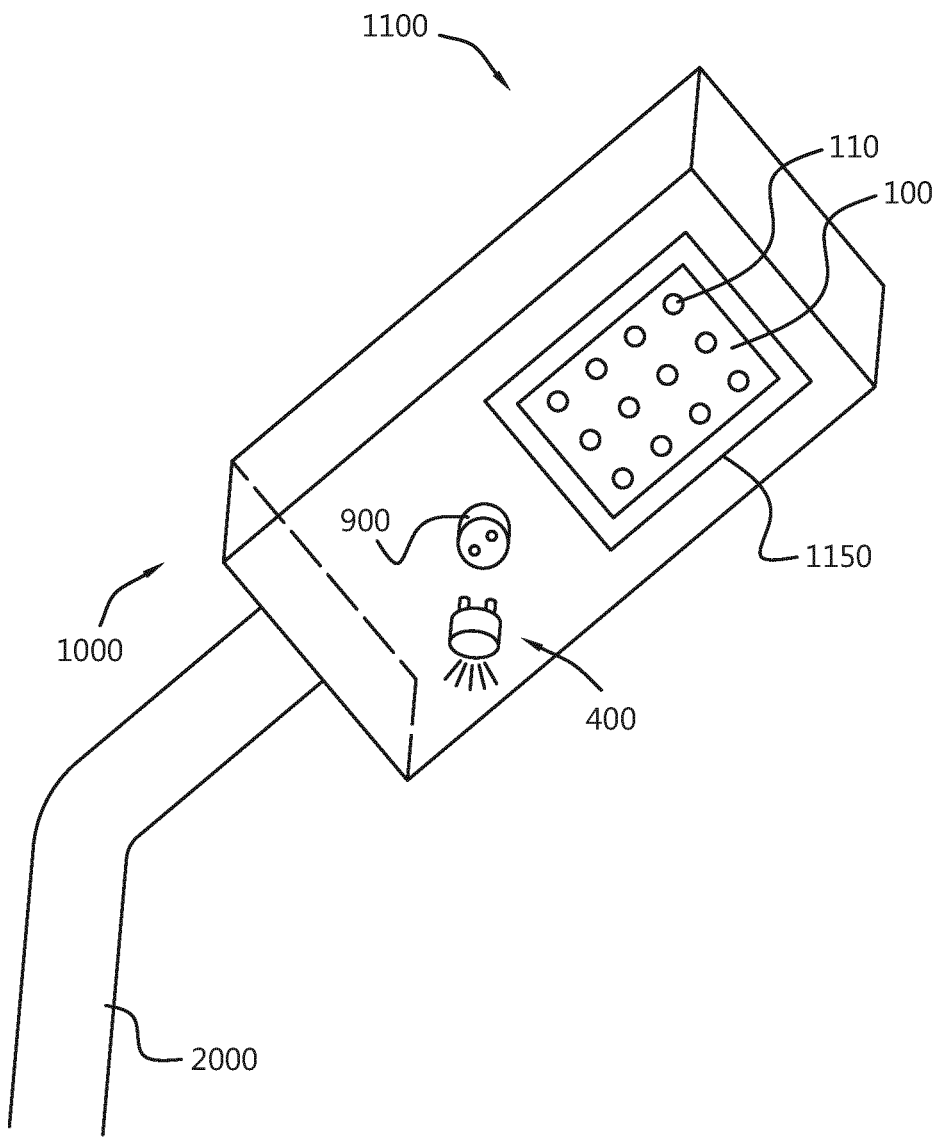
FIG. 18 is a schematic view of yet another exemplary embodiment of a luminaire system with a luminaire head and a pole.

FIG. 18 is a schematic view of another exemplary embodiment of a luminaire system with a luminaire head 1000 and a pole 2000. In other non-illustrated embodiments, the luminaire head 1000 may be connected to a wall or a surface without the need for the pole 2000. The luminaire head 1000 comprises a luminaire housing 1100 containing an SPD (not visible), a drive means (not visible) and a support 100 with a plurality of light sources 110 thereon. The luminaire housing 1100 comprises a casing 1160 and a transparent or translucent cover 1150 allowing light emitted by the light sources 110 to be emitted out of the luminaire housing 1100. The SPD comprises surge protection circuitry and monitoring circuitry configured to monitor a malfunctioning of the surge protection circuitry and to provide an output signal based on said monitoring. The luminaire housing 1100 is provided with a socket 900. The socket may be arranged in an opening in the casing 1160, preferably in a tight manner. An indicator device 400, e.g. an indicator LED, is arranged in the socket 900. The monitoring circuitry is connected to the socket 900 such that a state of the indicator device 400 is changed when the output signal indicates a malfunctioning. The connection between the monitoring circuitry and the socket 900 can be done in any suitable manner, e.g. as described in connection with FIG. 1A or 1B, FIG. 2A or 2B, or FIG. 3. The socket 900 may be a simple socket. However, in other embodiments the indicator device 400 may be implemented as an external module capable of a performing other functions, such as sensing or additional signalling, next to the signalling a malfunctioning of the surge protection circuitry. For example, the external module may be an external module which can be inserted in a NEMA or Zhaga socket. One of the contacts of such a socket may then be used to transmit the output signal. For example, the socket 900 and the external module implementing the indicator device 400 may fulfil the requirements of the ANSI C136.41-2013 standard or of the ANSI C136.10-2017 standard or of the Zhaga Interface Specification Standard (Book 18, Edition 1.0, July 2018, see https://www.zhagastandard.org/data/downloadables/1/0/8/1/book_18.pdf). Examples of possible external modules are disclosed in patent applications PCT/EP2019/081006, NL2022954 and NL2023425 in the name of the applicant, which are included here by reference.

Whilst the principles of the invention have been set out above in connection with specific embodiments, it is to be understood that this description is merely made by way of example and not as a limitation of the scope of protection which is determined by the appended claims.

The invention claimed is:

1. A luminaire system comprising a luminaire housing having a transparent or translucent cover, a support with at least one light source arranged thereon, a drive means configured for driving the at least one light source, a surge protection device between a power supply and the drive means, and an indicator device, wherein said surge protection device comprises surge protection circuitry and monitoring circuitry configured to monitor a malfunctioning of the surge protection circuitry and provide an output signal based on said monitoring, wherein said monitoring circuitry is connected such that a state of said indicator device is changed when the output signal indicates a malfunctioning; wherein said indicator device is arranged at a location which is such that the state of the indicator device is visible from outside of the luminaire housing in a closed state of said luminaire housing.

2. The luminaire system of claim 1, wherein the indicator device is arranged on or in the luminaire housing.

3. The luminaire system of claim 1, wherein the indicator device is arranged on the support of the at least one light source.

4. The luminaire system of claim 1, wherein the support is arranged in the luminaire housing, opposite the cover.

5. The luminaire system of claim 1, wherein the indicator device comprises an indicator light element and a light guide arranged for guiding light of the indicator light element to a location which is such that the state of the indicator device is visible from outside of the luminaire housing.

6. The luminaire system of claim 5, wherein the luminaire housing comprises a transparent or translucent cover, wherein the support is arranged in the luminaire housing, opposite the cover, and wherein the light guide extends from the indicator light element to a location on or near the support, such that light passing through the light guide is emitted out of the cover; or further comprising a pole to which the luminaire housing is attached, wherein the light guide extends from the indicator light element to a location in the pole accessible to an operator.

7. The luminaire system of claim 1, wherein the luminaire housing is provided with a socket, wherein the indicator device is arranged in said socket, wherein the monitoring circuitry is connected in such a way to the socket that a state of said indicator device is changed when the output signal indicates a malfunctioning.

8. The luminaire system of claim 1, wherein said monitoring circuitry is connected such that said output signal is provided to:

the indicator device such that a state of said indicator device is changed when the output signal indicates a malfunctioning, drive circuitry of the drive means configured for driving the indicator device based on the output signal, such that a state of said indicator device is changed when the output signal indicates a malfunctioning, a control means configured for controlling the drive means based on said output signal, wherein the drive means is configured to drive the indicator device such that a state of said indicator device is changed when the output signal indicates a malfunctioning.

9. A luminaire system comprising a support with at least one light source arranged thereon, a drive means configured for driving the at least one light source, a control means configured for controlling the drive means, a surge protection device between a power supply and the drive means, and a transmission means, wherein said surge protection device comprises surge protection circuitry and monitoring circuitry configured to monitor a malfunctioning of the surge protection circuitry and provide an output signal based on said monitoring, wherein the drive means is configured to convert an AC voltage in a DC drive current for the at least one light source;

wherein said monitoring circuitry is connected such that said output signal can be provided to the transmission means and the transmission means is configured for transmitting a malfunction message to a remote device based on the output signal, and wherein the transmission means and the drive means are included in a driver having a single driver housing.

10. The luminaire system of claim 9, wherein the transmission means is configured to receive a request for information about the functioning of the surge protection circuitry from the remote device, and to send a malfunction message comprising an indication whether or not there is a malfunctioning of the surge protection circuitry based on the output signal to the remote device.

11. A luminaire system comprising a support with at least one light source arranged thereon, a drive means configured for driving the at least one light source, a surge protection device between a power supply and the drive means, and a display comprising a display screen, wherein said surge protection device comprises surge protection circuitry and monitoring circuitry configured to monitor a malfunctioning of the surge protection circuitry and provide an output signal based on said monitoring, wherein said monitoring circuitry is connected such that a message is indicated on the display screen when the output signal indicates a malfunctioning, and wherein the display screen is further configured to display information other than the message indicating the malfunctioning.

12. The luminaire system of claim 11, wherein said monitoring circuitry is connected such that said output signal is provided to:

the display such that said display can indicate a malfunctioning when the output signal indicates a malfunctioning, a control means configured for controlling the display based on said output signal, drive circuitry of the drive means configured for driving the display based on the output signal.

13. The luminaire system according to claim 1, further comprising a transmission means, wherein said monitoring circuitry is connected such that said output signal is provided to the transmission means and the transmission means is configured for transmitting a malfunction message to a remote device based on the output signal.

14. The luminaire system according to claim 1, wherein the indicator device comprises at least one LED.

15. The luminaire system according to claim 1, wherein the indicator device is configured to emit light different from the light emitted by the at least one light source; or further comprising an optical plate arranged opposite the at least one light source, wherein the indicator device comprises at least one indicator light element arranged to emit light through a peripheral edge of the optical plate, wherein preferably the optical plate is provided with light guiding elements configured for guiding light from the at least one indicator light element out of the luminaire system; or further comprising an optical plate arranged opposite the at least one light source, wherein the indicator device comprises at least one indicator light element, and the optical plate comprises at least one optical element associated with the at least one indicator light element.

16. The luminaire system according to claim 1, wherein the support is a PCB.

17. The luminaire system according to claim 1, wherein the surge protection circuitry and monitoring circuitry is arranged in a housing, said housing being provided with at least two power terminals for connecting the surge protection circuitry to a power supply, at least one output terminal for outputting the output signal, and optionally a ground or equipotential terminal; or wherein the surge protection circuitry comprises at least one metal oxide varistor, MOV; or wherein the surge protection circuitry comprises at least one thermal protection device such as a thermal fuse.

18. The luminaire system according claim 17, wherein a thermal fuse and a MOV are connected in series between the two power terminals, wherein preferably the monitoring circuitry comprises a first monitoring line connected to a first terminal of the MOV and a second monitoring line connected to a second terminal of the MOV; and/or wherein the surge protection circuitry comprises a gas discharge tube connected between the ground or equipotential terminal and at least one of the at least two power terminals.

19. The luminaire system according to claim 1, wherein the drive means is configured to convert an AC voltage in a DC drive current for the at least one light source; or wherein the at least one light source comprise a plurality of LEDs; or wherein the drive means is arranged in a driver housing.

20. The luminaire system according to claim 19, wherein the surge protection circuitry and the monitoring circuitry are arranged in a pluggable surge protection module and wherein the driver housing is configured to receive the pluggable surge protection module such that the surge protection circuitry is connected to a power supply side of the drive means when plugged in;

wherein preferably the driver housing is provided with at least two power supply terminals, and wherein a connection inside the driver housing connects the at least two power supply terminals with the surge protection circuitry when the pluggable surge protection module is plugged in; or wherein preferably the pluggable surge protection module is provided with at least two power supply terminals, and a connection inside the pluggable module connects the at least two power supply terminals with the surge protection circuitry, and wherein the at least two power supply terminals are connected to the drive means, when the pluggable surge protection module is plugged-in.

* * * * *